INVENTOR.
Richard R. Pryor
BY
Eyre, Mann & Burrows
ATTORNEYS

Patented Oct. 26, 1954

2,692,654

UNITED STATES PATENT OFFICE 2,692,654

IMPINGEMENT-STRAINER COMBINATION AIR FILTER

Richard R. Pryor, Jackson Heights, N. Y., assignor, by mesne assignments, to Pittsburgh Plate Glass Company, Pittsburgh, Pa., a corporation of Pennsylvania Application March 12, 1953, Serial No. 341,929

3 Claims. (Cl. 183—45)

This invention relates to an improved filtering material for use in air conditioning systems and the like. This application is a continuation in part of my copending application Serial No. 219,260, filed April 4, 1951, and now abandoned, covering the same subject-matter.

In carrying out my invention, I provide a filter casing with a fluffy openwork mass of superimposed layers of waved glass fibers arranged to form a network of connecting air passages and a reinforcing flat porous sheet of crossed glass fibers. In use the air stream first contacts the fluffy fibrous mass where it is broken down into many small streams. These small streams abruptly change direction a number of times in passing through the mass and thereby throw the larger dust particles out against the individual fibers. In other words, the fluffy mass acts as an impingement type filter to take out the large dust particles. The residual smaller dust particles with practically no mass which are not taken out by impingement are strained from the air by the minute pores in the glass sheet.

My invention may be readily understood by reference to the accompanying drawing in which—

Figure 1:
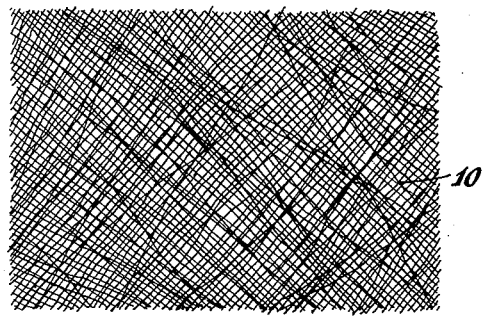
Fig. 1 is a plan view of the face of the glass sheet.
Figure 2:
Fig. 2 is an enlarged view of one edge of the sheet.
Figure 3:
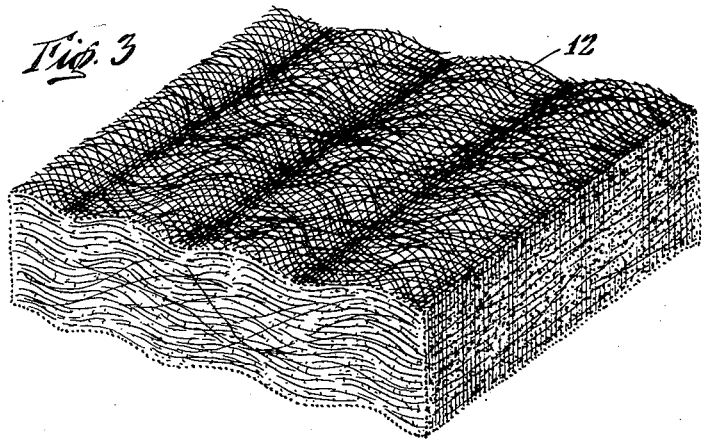
Fig. 3 is a perspective view of the open fluffy mass.
Figure 4:
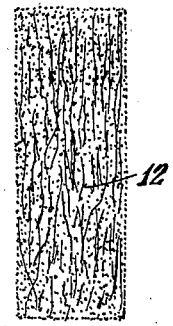
Fig. 4 shows its edge.
Figure 5:
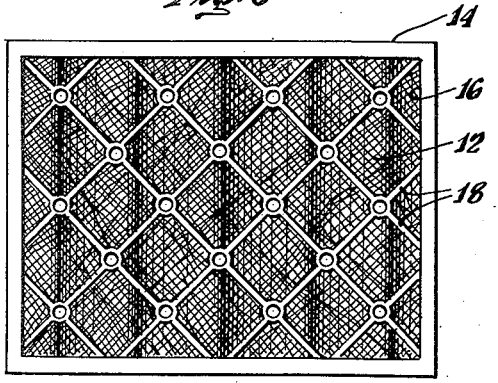
Fig. 5 is a plan view of the assembled filter.
Figure 6:
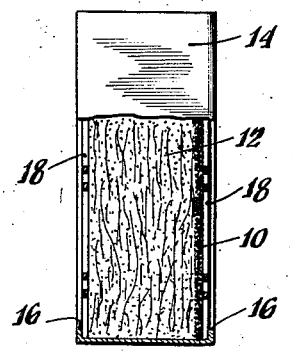
Fig. 6 is a side view of the filter partly in section.

In the drawings the number 10 represents the glass sheet and 12 the fluffy mass. The manufacture of these units is not within the scope of this invention and will not be described here in detail. Fluffy mass 12 may however be conveniently prepared as described in United States Patent No. 2,546,230. As there described the openwork mass may be formed by drawing out a large number of parallel glass fibers from a furnace which is made to move slowly back and forth across the face of a rotating drum. The reciprocating movement of the furnace lays the fibers down in a series of layers on the drum so that the fibers in adjacent layers cross each other at a very slight angle. While the fibers are being assembled on the drum they are given a light spray of a standard form of a liquid resin such as a liquid phenolic resin, which should be maintained in liquid form during expansion of the mat as described below. After a sufficient number of layers of fiber have accumulated (the number of layers is not critical but will ordinarily exceed twenty-five), the mat is cut across the face of the drum, laid out flat and then expanded along a line running approximately at right angles to the direction of the fibers. As the mat is expanded the individual fibers twist, curl and form undulations which cause the mat to puff up into a highly porous openwork mass. The product is then taken up on a furnace conveyor and baked to set the resin binder.

The resulting product is a resilient openwork mass of stiffened glass fibers comprising a plurality of superimposed layers of glass fibers with the fibers in adjacent layers in crossed relationship. The layers are substantially parallel to one another and each layer has fibers forming substantially uniform contiguous undulations projecting above and below the medium plane of the layer. The layers are generally separate but tied together by a multiplicity of interconnecting curled fibers. The fibers are continuous strands of glass—that is, a major portion of them run from one edge of a cut piece to the other edge, either adjacent or opposite, and only a minor portion (where the fibers have been broken) show ends within the mass.

Glass sheet 10 is an entirely different type of material from fluffy openwork mass 12. As distinguished from the open arrangement of the fibers in the fluffy mass, the crossed glass fibers in the sheet lie flat against each other and the fiber layers are matted down tightly against each other. This arrangement of the fibers gives a flat sheet having a multitude of micro apertures on the surface of the sheet, as distinguished from the relatively few large openings on the surface of the fluffy mass.

Glass sheet 10 is a commercial unit available on the open market. I prefer to use a crossed glass fiber sheet in which a major portion of the fibers are continuous strands of glass running from one edge of a cut piece to the other edge. In such case the arrangement of the fibers tends to be more uniform and this insures uniformity in the size and arrangement of the minute pores in the sheet. A matted glass fiber sheet with continuous strands of glass may be made in substantially the same way as above described for the openwork mass. When a glass sheet 10 is to be formed, the mat is fully expanded before the binder is applied and as a result the glass fibers remain matted flat against each other and the mat does not puff up as in the case of the openwork mass. After the mat is expanded, the resin binder is applied and the mat is baked to set the resin and form the finished sheet.

In my filtering material the crossed glass fiber sheet 10 and fluffy mass 12 provides two distinct filtering zones, each of which has an entirely different filtering action. On the inlet side, filtering is carried out by impingement of the dust particles against the individual fibers and the interstices in fluffy mass 12 are much larger than the dust particles removed from the air stream. As a result, a substantial amount of the smaller dust particles pass right through this zone and remain in the air stream until they reach the second filtering zone of sheet 10. Here these residual smaller dust particles with practically no mass are positively strained out of the air by the minute pores in sheet 10 which are smaller than the dust particles.

Care must be taken in the selection of the material for each zone in order to establish the proper balance in filtering action between the zones. For example, the percentage of the dust removed by fluffy mass 12 may be increased by increasing the thickness and density of the fluffy mass and by grading the fibers from the front to the back so that the outlet side of the fluffy mass is provided with very fine fibers and consequently smaller interstices. However, the filtering action still depends on impingement, and if fluffy mass 12 is made thick and dense enough to take out all the smaller dust particles (particles normally removed from the air by sheet 10), the drop in air pressure across the fluffy mass becomes so high that the material is impractical for commercial use. On the other hand, if the interstices in the fluffy mass are too large and the thickness and density of the material too low, then the dust accumulates on the surface of strainer sheet 10 so quickly that the drop in pressure across the filtering material exceeds operable limits in a matter of an hour or two.

I achieve the desired balance of filtering action between the two zones by controlling the diameter of the individual fibers and unit weight of the materials. In this connection, it is to be noted that even though the arrangement of the fibers in fluffy mass 12 is entirely different from the arrangement of the fibers in sheet 10, the average size of the apertures in both cases is a function of the diameter of the individual fibers and weight of a unit of the material. Accordingly the average size of the apertures in fluffy mass 12 and sheet 10 may be expressed in terms of the fiber diameter and weight of the material. I have achieved a tremendously efficient filtering material by keeping the fibers in fluffy mass 12 between .0005 and .0011 inch in diameter and by keeping the fibers so openly spaced that the weight of the mass is equal to between 1½ to 8 ounces per cubic foot. I keep the fiber diameter in sheet 10 the same as in fluffy mass 12, but the apertures in the sheet are so small that the sheet weighs between 80 to 125 ounces per cubic foot. The apertures have maximum size with a low weight material and large fiber diameter. Minimum size is obtained with a high weight material and small fiber diameter.

As to thickness of the filtering material, since sheet 10 acts as a strainer, filtering action takes place only on the surface of the sheet and there is no advantage in making the sheet thick. Therefore, I maintain the thickness of sheet 10 between .007 and .05 inch. Within this range of thickness, the drop in pressure across the sheet is very small (this increases filter life) and sheet 10 is sufficiently strong and rigid to provide a reinforcing wall for fluffy mass 12. This helps to keep the open fibrous structure of fluffy mass 12 intact during shipment and use. As described above, fluffy mass 12 must be thick enough to prevent the dust from rapidly clogging the pores in sheet 10, but it must not be so thick that the drop in pressure across the finished filter exceeds operable limits. Since my filter must be replaced when the pressure drop across it is equivalent to a drop in pressure of .6 inch of water across a test sample 2 inches thick in an air stream moving at 300 cubic feet per minute in a one foot square test chamber, I control the thickness of fluffy mass 12 by the drop in pressure across the combination of fluffy mass and sheet 10. I have found that the most efficient filtering action and filter life cycle are achieved by making the fluffy mass of such thickness that the drop in pressure across the combination is equivalent to a drop in pressure in an air stream of from .035 to .15 inch of water measured across a test sample as described above. Within the specified range, fluffy mass 12 will be approximately ¾ to 3 inches thick. Of course the pressure drop across the filter will steadily increase when it is in use in an air stream as dirt accumulates, and as stated above the filter need not be replaced until the drop in pressure across the filter is equivalent to a drop in pressure of .6 inch of water across a test sample 2 inches thick in an air stream moving at 300 cubic feet per minute in a one foot square test chamber. While I prefer to make the fluffy mass of such thickness that the initial pressure drop across the filter is from .035 to .15 inch in an air stream moving at 300 cubic feet per minute in a one foot square test chamber, it will be understood that a useful and operable structure will be achieved as long as the initial drop in pressure across the filter is less than the equivalent of .6 inch of water in the test chamber for a filter 2 inches thick.

In the example of my invention shown, filter casing 14 consists of a four-sided framework with two open faces indicated at 16. Across these faces is a skeletonized network of wire 18 having large interstices which have a negligible effect on the pressure drop across the filter. The assembled filter comprises fluffy mass 12, which is fitted snugly against the sides of casing 14 and held slightly compressed against wires 18 by sheet 10. This slight compression places the fluffy mass under positive pressure so that its fibers are tensed and thus held in a set position within casing 14. If desired, these fibers may be treated with an adhesive, such as oil or grease, to increase their capacity for dust. Sheet 10 rests against wires 18 on the opposite or downstream side of casing 14 to provide a sturdy support for the fluffy mass. In operation the filter is installed in the air stream with glass sheet 10 on the downstream side where it acts as a rigid retaining wall for the fluffy mass.

By controlling the selection of the materials for each zone in my filtering material as described, I have found that it is possible to screen out even the finest of dust particles resulting in a tremendously efficient filtering material and the selective removal of the larger particles by impingement in the fluffy mass prevents rapid clogging of the sheet, giving my filter a long life.

It will be understood that it is intended to cover all changes and modifications of the preferred embodiment of this invention herein chosen for the purpose of illustration which do not constitute

What I claim is:

1. In an air filter the combination which comprises an openwork mass of glass fibers having a plurality of superimposed layers of glass fibers with the fibers of adjacent layers in crossed relationship, the layers lying substantially parallel to one another and each layer having substantially uniform contiguous undulations projecting above and below the medium plane of the layer, said superimposed layers being generally separate but tied together by a multiplicity of interconnecting curled fibers, a binder bonding said fibers into a substantially unitary body in which a major portion of said fibers are continuous from one edge to another edge of the mass and said fibers being so openly spaced that the weight of the mass is equal to between 1½ to 8 ounces per cubic foot, a flat porous sheet of crossed glass fibers with minute pores in which the crossed fibers are so compact that the weight of the mass is equal to between 80 to 125 ounces per cubic foot, said sheet being positioned against the openwork mass to form a rigid retaining wall which supports the mass and holds it compressed within the filter and said combination being of such thickness to cause a drop in pressure of an air stream passing through it equivalent to a drop in pressure of from .035 to .15 inch of water across a test sample in an air stream moving at 300 cubic feet per minute in a one foot test chamber, whereby the larger dust particles are removed from the air stream by impingement against the individual fibers in the openwork mass and the residual smaller dust particles are strained from the air by the minute pores in the glass fiber sheet.

2. A structure as specified in claim 1 in which the separate fibers of the openwork mass have a coating of adhesive for retention of dust.

3. In an air filter the combination which comprises an openwork mass of glass fibers having a plurality of glass fibers arranged in layers, each layer being made up of individual glass fibers which are arranged substantially parallel to one another in the layer, said layers being superimposed one on the other with the fibers in adjacent layers being in crossed relationship and each layer having fibers which project above and below the medium plane of the layer, said superimposed layers being generally separate but tied together by a multiplicity of interconnecting curled fibers, a binder bonding said fibers into a substantially unitary body in which a major portion of said fibers are continuous from one edge to another edge of the mass and said fibers being so openly spaced that the weight of the mass is equal to between 1½ to 8 ounces per cubic foot, a flat porous sheet of crossed glass fibers with minute pores in which the crossed fibers are so compact that the weight of the mass is equal to between 80 to 125 ounces per cubic foot, said sheet being positioned against the openwork mass to form a rigid retaining wall which supports the mass and holds it compressed within the filter and said combination being of such thickness to cause a drop in pressure of an air stream passing through it equivalent to a drop in pressure of less than .6 inch of water across a sample in an air stream moving at 300 cubic feet per minute in a one foot square test chamber, whereby the larger dust particles are removed from the air stream by impingement against the individual fibers in the openwork mass and the residual smaller dust particles are strained from the air by the minute pores in the glass fiber sheet.

References Cited in the file of this patent

UNITED STATES PATENTS

| Number | Name | Date |
|---|---|---|
| 2,117,371 | Slayter | May 17, 1938 |
| 2,138,874 | Myers | Dec. 6, 1938 |
| 2,220,127 | Slayter | Nov. 5, 1940 |
| 2,251,964 | Stackhouse | Aug. 12, 1941 |
| 2,546,230 | Modigliani | Mar. 27, 1951 |